United States Patent
Abe

(10) Patent No.: US 7,668,985 B2
(45) Date of Patent: Feb. 23, 2010

(54) INFORMATION PROCESSING APPARATUS WITH UPGRADEABLE MODULAR COMPONENTS INCLUDING PROCESSOR, SYSTEM MEMORY, AND HARD DISK DRIVES

(75) Inventor: Takashi Abe, Tokyo (JP)

(73) Assignee: NEC Corporation, Tokyo (JP)

( * ) Notice: Subject to any disclaimer, the term of this patent is extended or adjusted under 35 U.S.C. 154(b) by 265 days.

(21) Appl. No.: 11/712,893

(22) Filed: Mar. 2, 2007

(65) Prior Publication Data
US 2007/0225829 A1 Sep. 27, 2007

(30) Foreign Application Priority Data
Mar. 3, 2006 (JP) .............................. 2006-057102

(51) Int. Cl.
*G06F 13/12* (2006.01)
(52) U.S. Cl. .............................. 710/62; 710/64; 710/72

(58) Field of Classification Search ....................... None
See application file for complete search history.

(56) References Cited

U.S. PATENT DOCUMENTS

| | | | |
|---|---|---|---|
| 5,878,241 A * | 3/1999 | Wilkinson et al. | 712/203 |
| 6,275,920 B1 * | 8/2001 | Abercrombie et al. | 712/14 |
| 2003/0167367 A1 * | 9/2003 | Kaushik et al. | 710/302 |
| 2006/0041783 A1 * | 2/2006 | Rabinovitz | 714/6 |

FOREIGN PATENT DOCUMENTS

| | | |
|---|---|---|
| JP | 9-181750 | 7/1997 |
| JP | 2001-310281 | 11/2001 |
| JP | 2005-149100 | 6/2005 |

* cited by examiner

*Primary Examiner*—Alan Chen
(74) *Attorney, Agent, or Firm*—Young & Thompson

(57) ABSTRACT

An information processing apparatus includes: a plurality of interfaces each of which supports any one of a plurality of types of devices; and a controller which controls devices. The interfaces and the controller are connected so as to link together in series.

7 Claims, 3 Drawing Sheets

INFORMATION PROCESSING APPARATUS WITH UPGRADEABLE MODULAR COMPONENTS INCLUDING PROCESSOR, SYSTEM MEMORY, AND HARD DISK DRIVES

BACKGROUND OF THE INVENTION

1. Field of the Invention

The present invention relates to an information processing apparatus connectable to a plurality of devices.

2. Description of the Related Art

An information processing apparatus used for a server, a personal computer and the like includes devices such as a central processing unit (CPU), a memory, a hard disk drive (HDD) and a Peripheral Component Interconnect (PCI) slot (PCI is a trademark registered in the U.S.A.). Certain types of devices are attachable to and detachable from a main body of an information processing apparatus. The types and number of devices which can be connected to each information processing apparatus are set with respect to each information processing apparatus. A redesign of an apparatus is necessary in order to change the types and number of the connectable devices (for example, to decrease the number of memories, and to increase the number of HDDs). A wide variety of specifications are demanded for an information processing apparatus. In design, it is necessary to prepare various types of apparatuses for the purpose of satisfying all the demands.

Japanese Patent Application Publication No. 2005-149100 discloses a server system including a plurality of servers and a signal processing unit which enables the servers to be operated with a set of consoles. The servers and the signal processing unit are connected to each other via a Plug and Play compliant interface, and this makes it easy to change the server system. For example, when a server is newly added to the server system, it is not necessary to power off the currently working servers.

In a conventional server system, a memory, a HDD and a PCI slot use different types of interfaces, respectively. Accordingly, the types and number of the connectable devices should be set when a decision is made on the specifications of an apparatus. Once the types and number of the connectable devices are set, it is difficult to change the setting. In other words, it is difficult to expand a range of choices to choose devices. In addition, in a case where another specification other than predetermined specifications is demanded, another apparatus should be prepared.

SUMMARY OF THE INVENTION

An object of the present invention is to provide an information processing apparatus achieving a wide range of choices to choose devices.

An information processing apparatus according to an aspect of the present invention includes: a plurality of interfaces each of which supports any one of a plurality of types of devices; and a controller which controls devices. The interfaces and the controller are connected so as to link together in series.

According to the information processing apparatus, it is possible to freely change the types and number of the connectable devices.

DESCRIPTION OF THE EXEMPLARY EMBODIMENT

An information processing apparatus of an exemplary embodiment is applied to a multi-slot server. The information processing apparatus includes a main body and a device group including a device which processes information and a device which stores information. The devices included in the device group are attachable to and detachable from the main body. It is possible to select a desired device among the device group, and then to attach the selected device to the main body.

Figure 1:
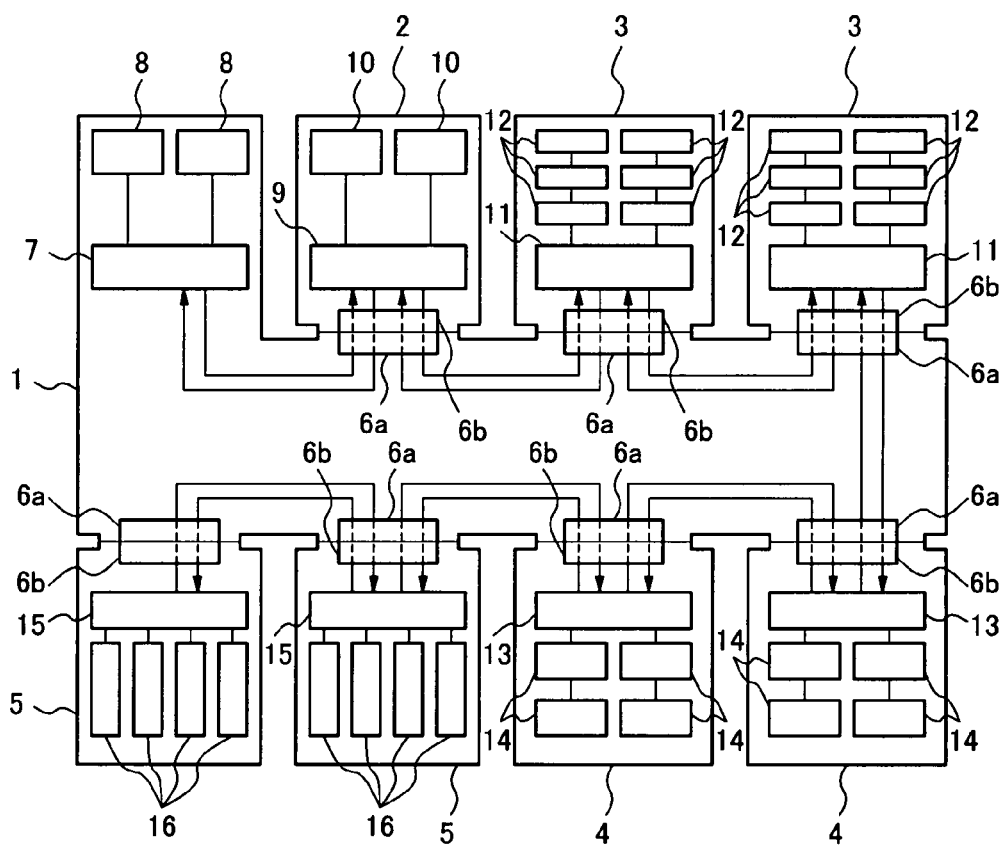
FIG. 1 is a block diagram of an example of an information processing apparatus according to an exemplary embodiment.

FIG. 1 shows elements mounted on a main board 1, an additional CPU board 2, two memory boards 3, two HDD boards 4 and two PCI boards 5. The main board 1 is included in the main body. Each of the boards 2, 3, 4 and 5 is connected to the main board 1 through a main-body side connector 6a and a device side connector 6b. The main board 1 is provided with seven main-body side connectors 6a, and each of the boards 2, 3, 4 and 5 is provided with one device side connector 6b. Each of the device side connectors 6b of the boards 2, 3, 4 and 5 is connectable to any one of the main-body side connectors 6a.

A main controller 7 and master CPUs 8 are mounted on the main board 1. The main controller 7 is included in a controller which controls the devices attached to the main body. Slave CPUs 10 and a buffer circuit 9 for the CPUs 10 are mounted on the CPU board 2. Memory modules 12 including random access memories (RAMs) and a buffer circuit 11 for the memory modules 12 are mounted on each of the memory boards 3. HDDs 14 and a buffer circuit 13 for the HDDs 14 are mounted on each of the HDD boards 4. PCI-Express connectors 16 and a buffer circuit 15 for the connectors 16 are mounted on each of the PCI boards 5 (PCI-Express is a trademark registered in the U.S.A.). The main controller 7 controls the slave CPUs 10, the memory modules 12, the HDDs 14 and the PCI-Express connectors 16. The slave CPUs 10, the memory modules 12, the HDDs 14 and the PCI-Express connectors 16 are included in the foregoing device group. The device group may further include other devices.

The information processing apparatus includes interfaces each of which supports any one of a plurality of types of devices. The information processing apparatus includes a plurality of main-body side interfaces provided to the main body, and device side interfaces which are connected to the respective devices included in the device group. The information processing apparatus of the exemplary embodiment includes seven main-body side interfaces. One device side interface is provided to each of boards on which the respective device is mounted.

Each of the main-body side interfaces includes one main-body side connector 6a. Each of the device side interfaces includes one device side connector 6b and one of buffer circuits 9, 11, 13 and 15. Each of the device side interfaces is connectable to any one of the main-body side interfaces. The main-body side interface and the device side interface which are connected to each other transmit information between the main board 1 of the main body and the device connected to the connected device side interface.

Recently, interfaces supporting serial high-speed transmission have been beginning to come into use for a CPU, a memory, a HDD, a PCI slot and the like. The interfaces employed for these devices are different from one another. The voltage level of the transmitted signal, the frequency thereof, the bit width and the like are fixed specifically for each of the interfaces. However, since their transmission methods are not different largely from one another, it is possible to make each of the interfaces connectable to any one of the main-body side interfaces.

The main controller 7 and the seven main-body side connectors 6a are connected so as to link together in series. The main controller 7 is connected to a certain (first) one of the main-body side connectors 6a, the first main-body side connector 6a is connected to a second main-body side connector 6a, and the second main-body side connector 6a is connected to a third main-body side connector 6a. In this way, the main-body side connectors 6a are connected serially. With this connection, the main controller 7 is electrically connected to the devices 10, 12, 14 and 16 through the buffer circuits 9, 11, 13 and 15. Each of the main-body side interfaces is connected to and paired with a device side interface of device side interfaces. Pairs of the main-body side interface and the device side interface transmit information between the main board 1 and each of devices 10, 12, 14 and 16. Pairs of the main-body side interface and the device side interface sequentially relay the transmitted information on the main board 1. Information transmitted in the information processing apparatus is transmitted in a serial transmission. FIG. 1 shows a pair of lines which represent a line transmitting information in a direction from the main controller 7 to the main-body side connectors 6a and a line transmitting information in the opposite direction. In FIG. 1, the bit width is not taken into consideration, and a power supply wiring, a wiring for a control signal, and the like are omitted. The main-body side connectors 6a are included in the above-mentioned interfaces each of which supports any one of a plurality of types of devices.

Figure 2:
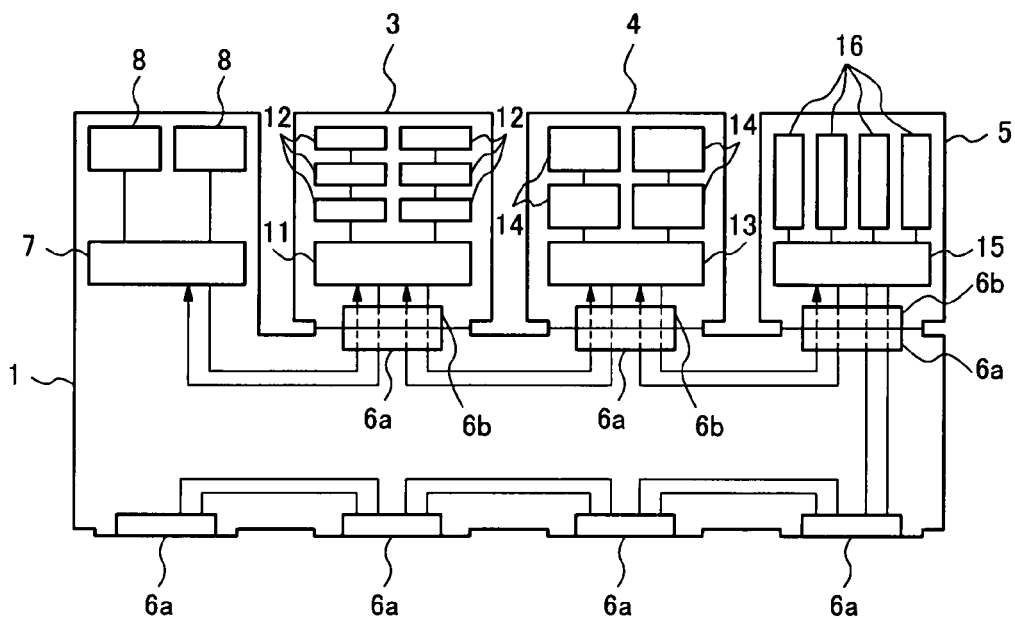
FIG. 2 is a block diagram of another example of the information processing apparatus according to the exemplary embodiment.

As shown in FIG. 2, only the minimum required devices to execute typical information processing may be attached to a main board 1. One board 3, one board 4 and one board 5 are connected to a main board 1. Four main-body side connectors 6a are connected to nothing. Three device side connectors 6b provided to the boards 3, 4 and 5 are respectively connected to three main-body side connectors 6a which are connected to the main controller 7 serially.

Figure 3:
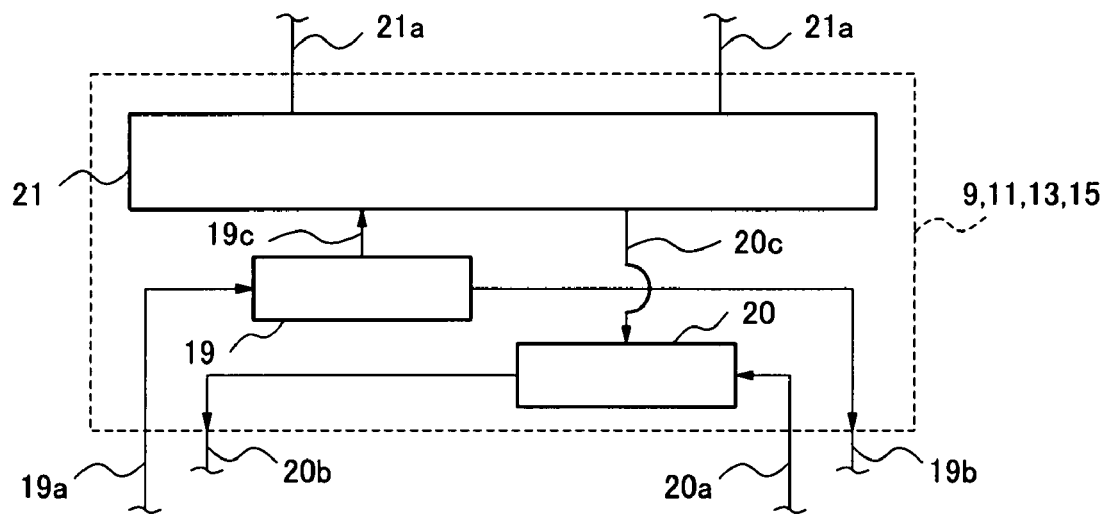
FIG. 3 is a block diagram of a buffer circuit.

The buffer circuits 9, 11, 13 and 15 have the same configuration. FIG. 3 shows the configuration. The buffer circuit 9, 11, 13 or 15 includes a control circuit 21 which controls the device 10, 12, 14 or 16 and driver/receiver circuits 19 and 20 each of which has a switching function. The control circuit, 21 gives and receives an input/output signal to and from the device 10, 12, 14 or 16 through lines 21a. The driver/receiver circuit 19 is connected to the device side connector 6b through lines 19a and 19b, and the driver/receiver circuit 20 is connected to the device side connector 6b through lines 20a and 20b.

The driver/receiver circuit 19 can receive information from the main controller 7 side through the line 19a, and can give the received information to the control circuit 21 though a line 19c. The driver/receiver circuit 19 can also give the received information through the line 19b to a board other than the board on which the driver/receiver circuit 19 receiving the information is mounted. The driver/receiver circuit 20 can receive information from a board other than the board on which this driver/receiver circuit 20 is mounted. The driver/receiver circuit 20 can also receive information from the control circuit 21 through the line 20c. The driver/receiver circuit 20 can transmits the received information toward the main controller 7 side through the line 20b.

Figure 4:
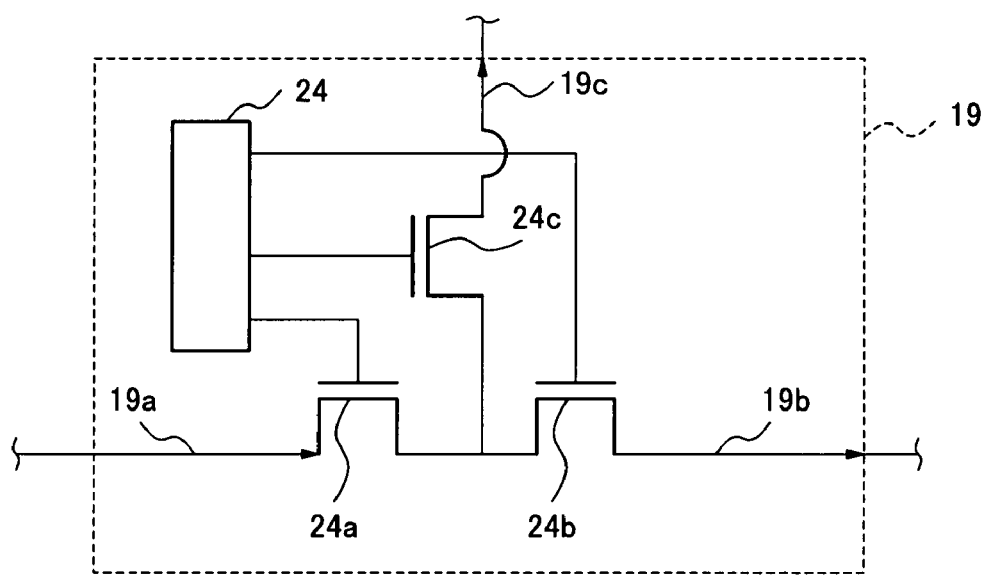
FIG. 4 is a block diagram of a driver/receiver circuit.

As shown in FIG. 4, in the driver/receiver circuit 19, the lines 19a, 19b and 19c are connected to one another, thus forming a junction of three lines. Switches 24a, 24b and 24c are provided on the lines 19a, 19b and 19c, respectively. The switch controller 24 controls the switches 24a, 24b and 24c in response to an instruction from the main controller 7. The switch controller 24 controls information transmission between the line 19a and the line 19c as well as information transmission between the line 19a and the line 19b. The driver/receiver circuit 20 has the same configuration as that of the driver/receiver circuit 19.

Figure 5:
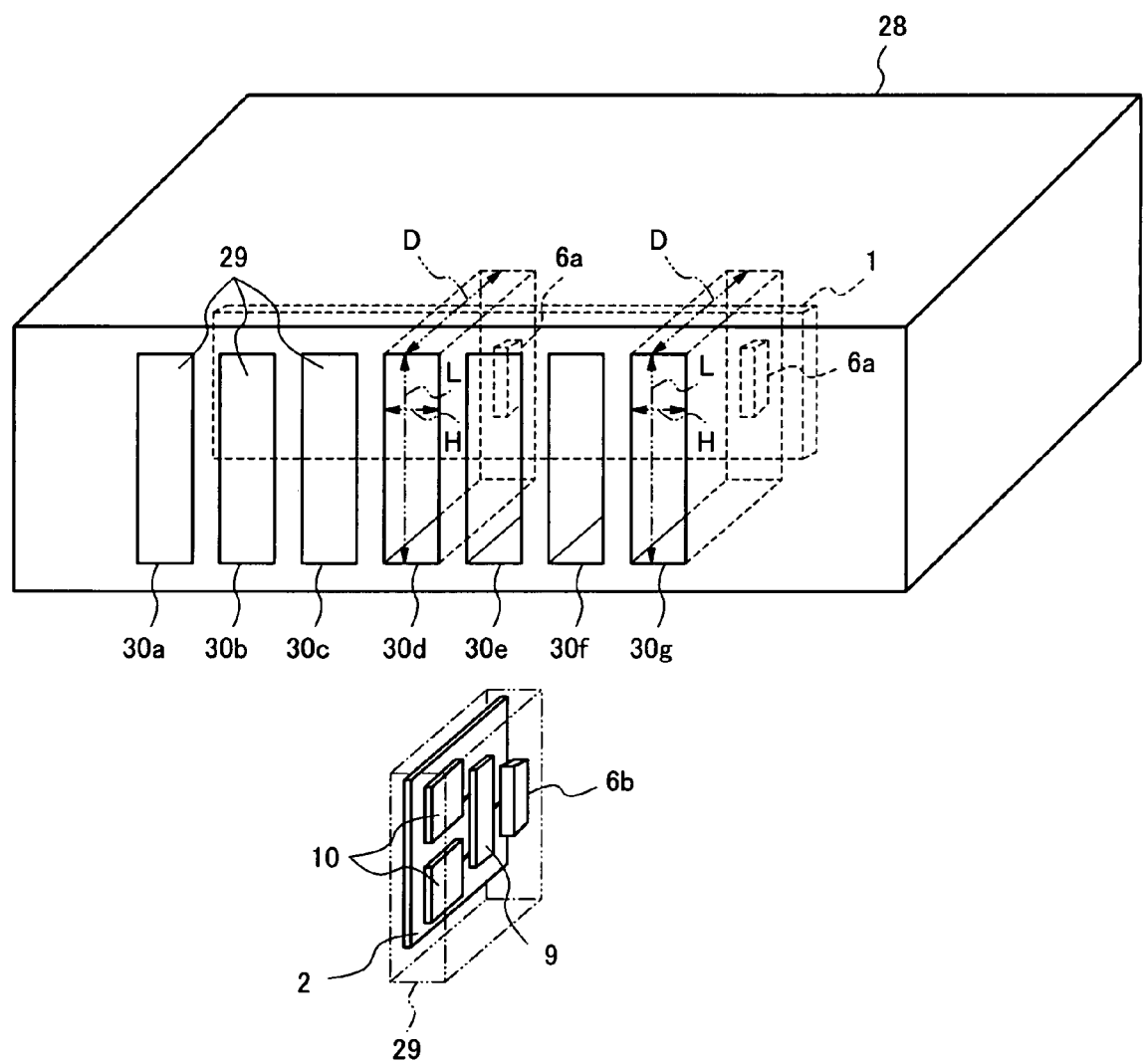
FIG. 5 is a perspective view of the information processing apparatus according to the exemplary embodiment.

As shown in FIG. 5, the main body includes a chassis 28 in which the main board 1 is incorporated. The chassis 28 are provided with a plurality of slots. FIG. 5 shows seven slots 30a, 30b, 30c, 30d, 30e, 30f and 30g. Each of the slots is provided with one main-body side connector 6a. The information processing apparatus includes bases each of which at least one device selected from the device group is mounted on. Each of bases is formed of the board on which the respective device is mounted (hereinafter, such a board is referred to as "device-mounted board"). Each of device-mounted boards is covered with a cover 29. FIG. 5 shows a board 2 as a representative of the device-mounted boards. The slots 30a to 30g have the same dimensions. Each of the device-mounted boards can be housed in any one of the slots 30a to 30g. FIG. 5 shows the dimensions of the slots 30d and 30g. The two slots have the same width H, length L and depth D. When each of the device-mounted boards is housed in any one of the slots 30a to 30g, the main-body side connector 6a and the device side connector 6b can be connected to each other.

When power is supplied to the information processing apparatus in a state the boards 2, 3, 4 and 5 are connected to the main board 1 as shown in FIG. 1, the controller 7 and the main CPU 8 recognize the connected boards 2, 3, 4 and 5. On the basis of this recognition, the main controller 7 accesses the devices 10, 12, 14 and 16. Information transmitted from the main controller 7 toward the buffer circuits 9, 11, 13 and 15 side is sequentially relayed by the buffer circuits 9, 11, 13 and 15. For example, when the main controller 7 transmits information to one of the buffer circuits 15, the information transmitted from the main controller 7 is transmitted through the buffer circuit 9, the two buffer circuits 11 and the two buffer circuits 13. In this way, the main controller 7 can access any one of the devices 10, 12, 14 and 16. Similarly, when power is supplied to the information processing apparatus in the state shown in FIG. 2, the main controller 7 can access any one of the devices.

As has been described above, in a case of a conventional server, it is difficult to change the types and number of devices which can be connected to a main body of a server. This requires high costs for designing. In the information processing apparatus of the exemplary embodiment, any type of devices can be attached to and detached from the main body. In other words, a range of choices to choose devices is wide, and thus costs, required for designing are low. A plurality of servers respectively having different specifications are used for a certain type of server system. Using the information processing apparatus of the exemplary embodiment for such a system results in a reduction in costs required for designing a server system.

This application is based upon and claims the benefit of priority from the prior Japanese Patent Application No. 2006-057102, filed Mar. 3, 2006, the entire contents of which are incorporated herein by reference.

Additional advantages and modifications will readily occur to those skilled in the art. Therefore, the invention in its broader aspects is not limited to the specific details shown and described herein. Accordingly, various modifications may be made without departing from the spirit or scope of the general invention concept as defined by the appended claims and their equivalents.

What is claimed is:

1. An information processing apparatus, comprising:
   a main body;
   a device group including a device which processes information and a device which stores information;
   a plurality of main-body side interfaces which are provided to the main body, and which are connected so as to link together in series; and
   a plurality of device side interfaces which are connected to the respective devices included in the device group, and each of which is connectable to any one of the main-body side interfaces,
   wherein each of at least two of the main-body side interfaces is connected to and paired with a device side interface of device side interfaces;
   each one of pairs of the main-body side interface and the device side interface transmits information between the main body and a device connected to the device side interface of the one of pairs; and
   pairs of the main-body side interface and the device side interface sequentially relay the transmitted information.

2. The information processing apparatus according to claim 1, further comprising a controller which is connected to the main-body side interfaces so as to link together in series, and which controls devices which are connected to the respective device side interfaces.

3. The information processing apparatus according to claim 1, wherein the device group includes a central processing unit, a random access memory and a hard disk drive.

4. The information processing apparatus according to claim 1, wherein
   each of the main-body side interfaces includes a main-body side connector,
   each of the device side interfaces includes a device side connector, and
   each of the device side connectors is connectable to any one of the main-body side connectors.

5. The information processing apparatus according to claim 1, further comprising bases each of which at least one device selected from the device group is mounted on, wherein
   the main body includes a chassis and a plurality of slots provided to the chassis, and
   each of the bases can be housed in any one of the slots.

6. The information processing apparatus according to claim 5, wherein the slots have the same dimensions.

7. The information processing apparatus according to claim 2, further comprising
   a plurality of buffer circuits which are provided to each of the devices, and which transfer signals from the controller to the device according to the control of the controller via pairs of the main-body side interface and the device side interface.

* * * * *